US012766846B2

(12) United States Patent
Tsugawa

(10) Patent No.: US 12,766,846 B2
(45) Date of Patent: Oct. 20, 2026

(54) INK LIQUID LEVEL HEIGHT MEASURING APPARATUS AND IMAGE FORMING APPARATUS

(71) Applicant: Konica Minolta, Inc., Tokyo (JP)

(72) Inventor: Shiori Tsugawa, Kyoto (JP)

(73) Assignee: KONICA MINOLTA, INC., Tokyo (JP)

( * ) Notice: Subject to any disclaimer, the term of this patent is extended or adjusted under 35 U.S.C. 154(b) by 120 days.

(21) Appl. No.: 18/882,280

(22) Filed: Sep. 11, 2024

(65) Prior Publication Data

US 2025/0100290 A1 Mar. 27, 2025

(30) Foreign Application Priority Data

Sep. 21, 2023 (JP) ................................ 2023-155521

(51) Int. Cl.
*B41J 2/175* (2006.01)
*G01F 23/30* (2006.01)
*G01F 23/62* (2006.01)

(52) U.S. Cl.
CPC .......... *B41J 2/17566* (2013.01); *G01F 23/30* (2013.01); *G01F 23/62* (2013.01); *B41J 2/17503* (2013.01); *B41J 2002/17576* (2013.01)

(58) Field of Classification Search
CPC .......... G01F 23/30; G01F 23/62; G01F 23/72; G01F 25/22; B41J 2/17566; B41J 2/17503; B41J 2002/17576
See application file for complete search history.

(56) References Cited

U.S. PATENT DOCUMENTS 6,378,971 B1 * 4/2002 Tamura ................ B41J 2/17523 347/7
9,335,201 B2 * 5/2016 Huang .................... G01F 23/74
2023/0311534 A1 * 10/2023 Maeshima ........... B41J 2/17596 347/85

FOREIGN PATENT DOCUMENTS

CN 104760422 A * 7/2015 ............. B41J 29/38
JP 2001141547 A * 5/2001
JP 2004333283 A * 11/2004
JP 2021-000783 A 1/2021
WO WO-2010079620 A1 * 7/2010 .......... B41J 2/17513

* cited by examiner

*Primary Examiner* — Sharon Polk
(74) *Attorney, Agent, or Firm* — LUCAS & MERCANTI, LLP

(57) ABSTRACT

Provided is an ink liquid level height measuring apparatus that includes: a detector that detects, as a continuous value, a change in a physical quantity associated with a change in a liquid level height of ink in a container; and at least one hardware processor. The at least one hardware processor obtains the liquid level height based on the physical quantity that has been detected.

12 Claims, 11 Drawing Sheets

INK LIQUID LEVEL HEIGHT MEASURING APPARATUS AND IMAGE FORMING APPARATUS

CROSS REFERENCE TO RELATED APPLICATIONS

The entire disclosure of Japanese Patent Application No. 2023-155521. filed on Sep. 21, 2023, is incorporated herein by reference in its entirety.

BACKGROUND

Technological Field

The present invention relates to an ink liquid level height measuring apparatus and an image forming apparatus.

Description of Related Art

In an inkjet-type image forming apparatus, an ink liquid level height measuring apparatus is provided in a tank that stores ink to be supplied to an inkjet head (see, for example, Japanese Patent Publication Laid-Open No. 2001-141547, and Japanese Patent Publication Laid-Open No. 2021-783).

The ink liquid level height measuring apparatuses disclosed in Japanese Patent Publication Laid-Open No. 2001-141547 and Japanese Patent Publication Laid-Open No. 2021-783 detect the upper and lower limits of the liquid level, and the liquid level to be measured is discrete. Accordingly, the problem with that is that the liquid level height between the upper limit and the lower limit of the liquid level is unknown, and that it is difficult to determine a failure of an ink supply apparatus or, even when a failure of an ink supply apparatus can be determined, the accuracy of the failure determination is insufficient.

SUMMARY

An object of the present invention is to provide an ink liquid level height measuring apparatus and an image forming apparatus each capable of continuously measuring the liquid level height of ink with high accuracy.

In order to achieve at least one of the above-described objects, an ink liquid level height measuring apparatus reflecting one aspect of the present invention includes: a detector that detects, as a continuous value, a change in a physical quantity associated with a change in a liquid level height of ink in a container; and at least one hardware processor, and the at least one hardware processor obtains the liquid level height based on the physical quantity that has been detected.

Furthermore, in order to achieve at least one of the above-described objects, an image forming apparatus reflecting one aspect of the present invention includes: a container that stores ink; an image former that forms an image by using the ink supplied from the container; and the ink liquid level height measuring apparatus described above.

BRIEF DESCRIPTION OF DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

Hereinafter, an embodiment of the present invention will be described in detail with reference to the accompanying drawings.

Image Forming Apparatus

Figure 1:
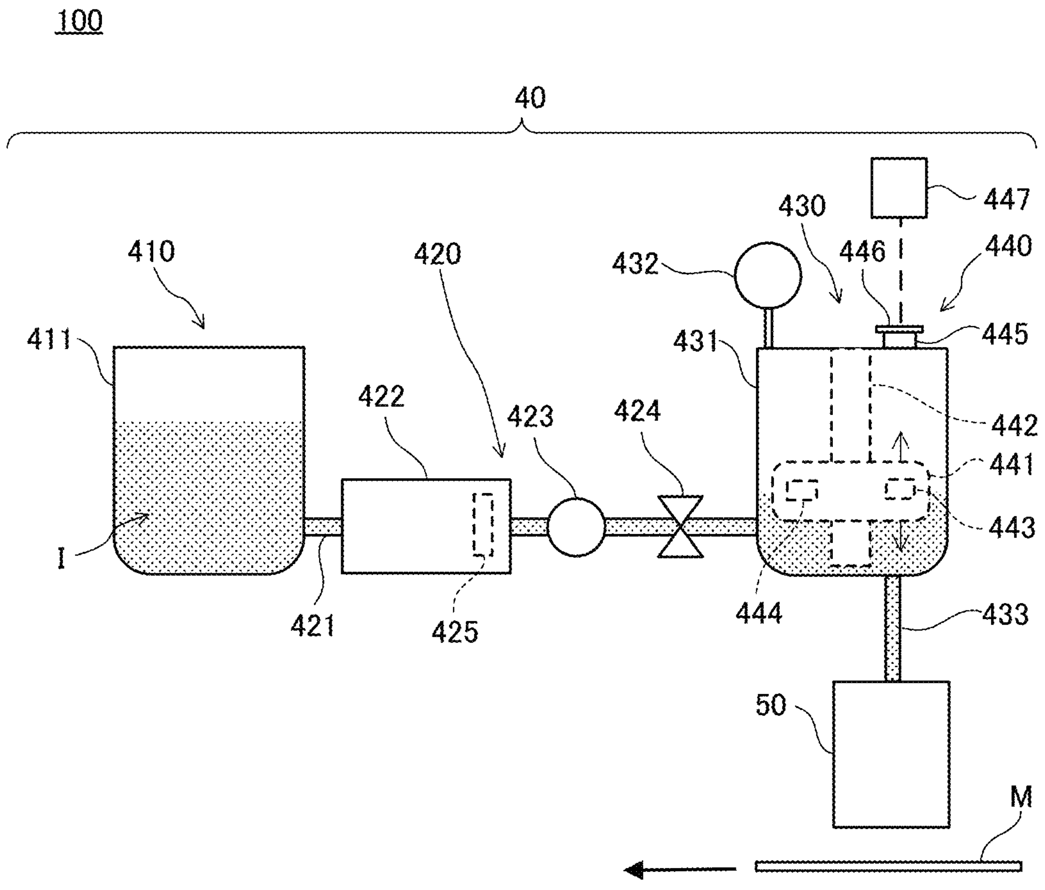
FIG. 1 is a schematic diagram illustrating examples of an image forming apparatus and an ink liquid level height measuring apparatus according to an embodiment of the present invention.
Figure 2:
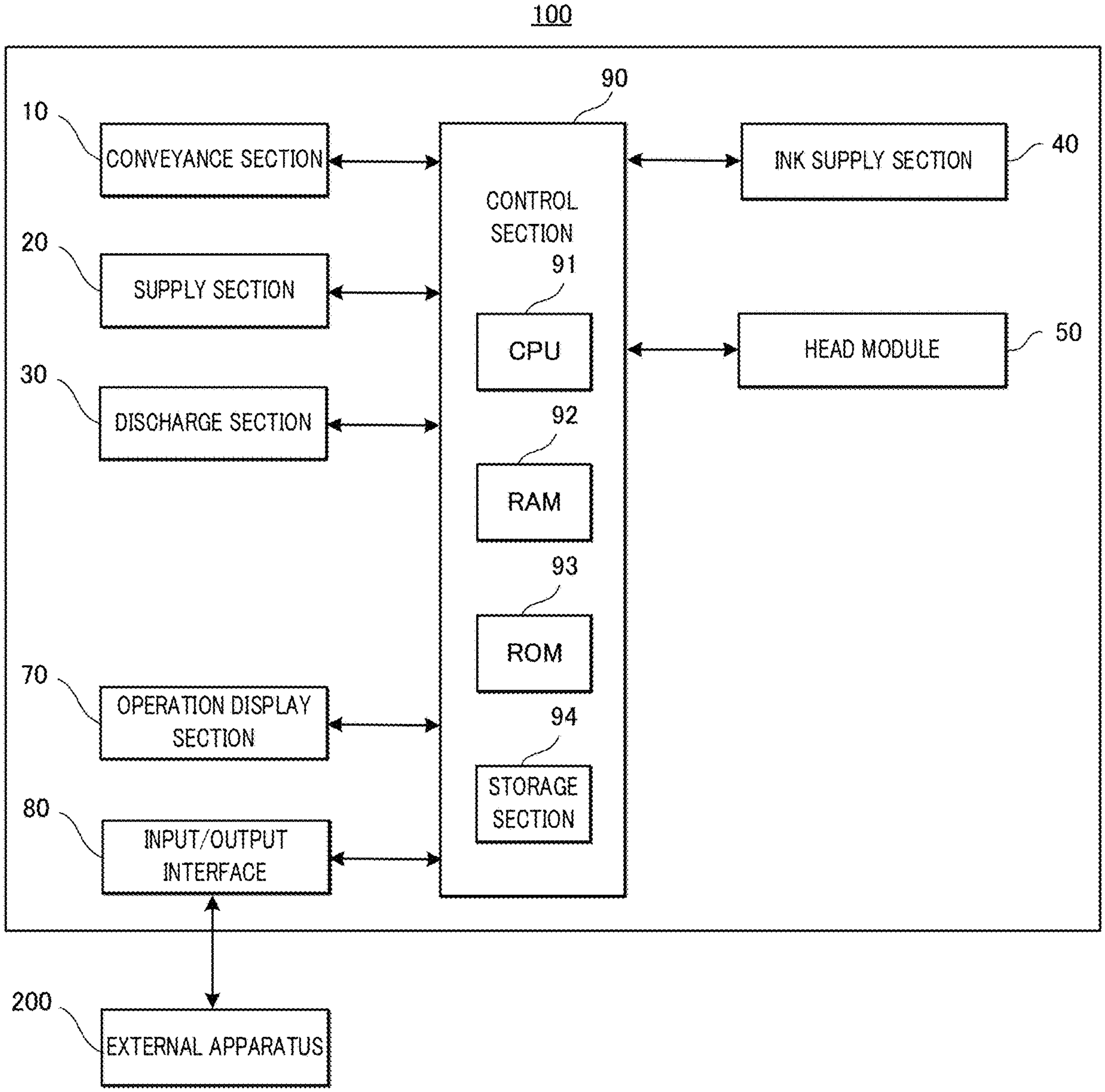
FIG. 2 is a block diagram illustrating a main part of a control system of the image forming apparatus illustrated in FIG. 1.

FIG. 1 is a schematic diagram illustrating examples of inkjet printer 100 (the image forming apparatus in the present invention) and ink liquid level height measuring apparatus 440 according to the present embodiment. FIG. 2 is a block diagram illustrating a main part of a control system of inkjet printer 100 illustrated in FIG. 1.

As illustrated in FIG. 2, inkjet printer 100 includes conveyance section 10, supply section 20, discharge section 30, ink supply section 40, head module 50 (the image forming section (image former) in the present invention), operation display section 70, input/output interface 80, control section 90, and the like.

Conveyance section conveys recording medium M (see FIG. 1). Conveyance section 10 is constituted by, for example, a conveyance belt, a conveyance drum, and the like. Recording medium M supplied from supply section 20 is conveyed to head module 50 by a conveyance operation of conveyance section 10. Thereafter, recording medium M on which an image has been formed by head module 50 is conveyed to discharge section 30 by a conveyance operation of conveyance section 10.

As recording medium M, it is possible to use various media on which ink ejected from an inkjet head (not illustrated) of head module 50 can be fixed. Recording medium M is, for example, a medium such as sheet-like paper, cloth (fabric), or resin. Recording medium M is not limited to a sheet-like medium, and may be a medium such as roll-shaped paper, cloth, or resin.

Supply section 20 stores recording medium M and supplies recording medium M to conveyance section 10. Supply section 20 includes, for example, a storage section that stores recording medium M, and includes a belt, a roller, and the like that convey recording medium M to conveyance section 10.

Discharge section 30 stores recording medium M discharged from conveyance section 10. Discharge section 30 includes, for example, a belt, a roller, and the like that convey recording medium M from conveyance section 10, and includes a storage section that stores recording medium M.

Ink supply section 40 is an apparatus that supplies ink I to head module 50. Ink supply section 40 includes first sub-tank section 410, liquid feed section 420, second sub-tank section 430, and ink liquid level height measuring apparatus 440.

First sub-tank section 410 stores ink I to be fed to second sub-tank section 430. First sub-tank section 410 includes first sub-tank 411 or the like that stores ink I. First sub-tank 411 is connected to a main tank (not illustrated) that stores ink I via a liquid feed path (not illustrated). Ink I stored in the main tank is fed to first sub-tank 411 by using a pump or the like (not illustrated).

Liquid feed section 420 feeds ink I stored in first sub-tank 411 to second sub-tank section 430 (second sub tank 431 to be described later). Liquid feed section 420 includes tank supply path 421 (the ink supply path in the present invention), deaeration module 422, pump 423, valve 424, and the like.

Tank supply path 421 connects first sub-tank 411 to second sub-tank 431, and serves as a flow path from first sub-tank 411 to second sub-tank 431. Deaeration module 422 includes filter 425. Deaeration module 422 deaerates ink I to be fed, and filters ink I with filter 425.

Pump 423 is a pump that feeds ink I from first sub-tank 411 to second sub-tank 431. Valve 424 opens and closes tank supply path 421. For example, valve 424 opens when ink I is fed from first sub-tank 411 to second sub-tank 431, and valve 424 closes when ink I is fed from second sub-tank 431 to head module 50.

Second sub-tank section 430 stores ink I to be fed to head module 50. Second sub-tank section 430 includes second sub-tank 431 (the container in the present invention) that stores ink I, pneumatic pump 432, head supply path 433, ink liquid level height measuring apparatus 440, and the like.

Second sub-tank 431 is connected to first sub-tank 411 via tank supply path 421, and is connected to head module 50 via head supply path 433.

Pneumatic pump 432 is connected to an upper portion of second sub-tank 431, supplies air to an upper space of second sub-tank 431, and controls the air existing in the upper space to a desired pressure. Head supply path 433 connects a lower portion of second sub-tank 431 to head module 50. When the air in the upper space of second sub-tank 431 is controlled to a desired pressure, ink I in second sub-tank 431 is pushed out toward head supply path 433 by the air pressure of the air, and is fed to head module 50.

Second sub-tank section 430 described above is provided with ink liquid level height measuring apparatus 440 that measures the liquid level height of ink I in second sub-tank 431. Ink liquid level height measuring apparatus 440 may also be provided in first sub-tank section 410 to measure the liquid level height of ink I in first sub-tank 411. Ink liquid level height measuring apparatus 440 will be described later.

Head module 50 includes apparatuses and members necessary for image formation, such as an inkjet head. Head module 50 ejects, from the inkjet head, ink I supplied from ink supply section 40 (second sub-tank section 430) to form an image on recording medium M.

Note that, in FIG. 1, in order to simplify the drawing, ink supply section 40 and head module 50 for one color are illustrated, but ink supply section 40 and head module 50 are disposed according to the number of colors to be used. For example, in a case where four colors of yellow (Y), magenta (M), cyan (C), and black (K) are used, ink supply section 40 and head modules 50 for the four colors are disposed.

Operation display section 70 is, for example, a flat panel display, such as a liquid crystal flat panel display or an organic electro luminescence (EL) flat panel display, with a touch screen. Operation display section 70 displays an operation menu for the user, information on image data, various states of inkjet printer 100, and the like. In addition, operation display section 70 includes a plurality of keys, and receives various input operations of the user.

Input/output interface 80 mediates transmission and reception of data between external apparatus 200 and control section 90. Input/output interface 80 includes, for example, various serial interfaces, various parallel interfaces, or a combination of thereof.

External apparatus 200 is, for example, a personal computer, a facsimile machine, or the like, and supplies a print job, image data, and the like, to control section 90 via input/output interface 80.

Control section 90 includes central processing unit (CPU) 91, random access memory (RAM) 92, read only memory (ROM) 93, storage section 94, and the like.

CPU 91 reads various control programs and setting data stored in ROM 93, stores the read programs and setting data in RAM 92, and executes the programs to carry out various pieces of calculation processing. For example, control section 90 generates, based on image data received from input/output interface 80, a driving signal for an image to be formed, and outputs the driving signal to the inkjet head.

RAM 92 provides a working memory space for CPU 91 and stores temporary data. Note that, RAM 92 may include a non-volatile memory.

ROM 93 stores the various control programs to be executed by CPU 91, the setting data, and the like. Note that, a rewritable non-volatile memory such as an electrically erasable programmable read only memory (EEPROM) or a flash memory may also be used instead of ROM 93.

Storage section 94 stores a print job and image data associated with a print job, which are inputted from external apparatus 200 via input/output interface 80. As storage section 94, for example, a hard disk drive (HDD) is used, and a dynamic random access memory (DRAM) or the like may also be used in combination.

Conveyance section 10, supply section 20, discharge section 30, ink supply section 40, head module 50, operation display section 70, input/output interface 80, and the like are connected to control section 90. Control section 90 integrally controls the entire operation of inkjet printer 100. Conveyance section 10, supply section 20, discharge section 30, ink supply section 40, head module 50, operation display section 70, input/output interface 80, and the like are controlled by control section 90 to execute predetermined processing.

With the above-described configuration, inkjet printer 100 supplies recording medium M from supply section 20 to conveyance section 10, forms an image on recording medium M conveyed by conveyance section 10 with head module 50, and conveys recording medium M, on which the image has been formed, to discharge section 30.

Ink Liquid Level Height Measuring Apparatus

Figure 3:
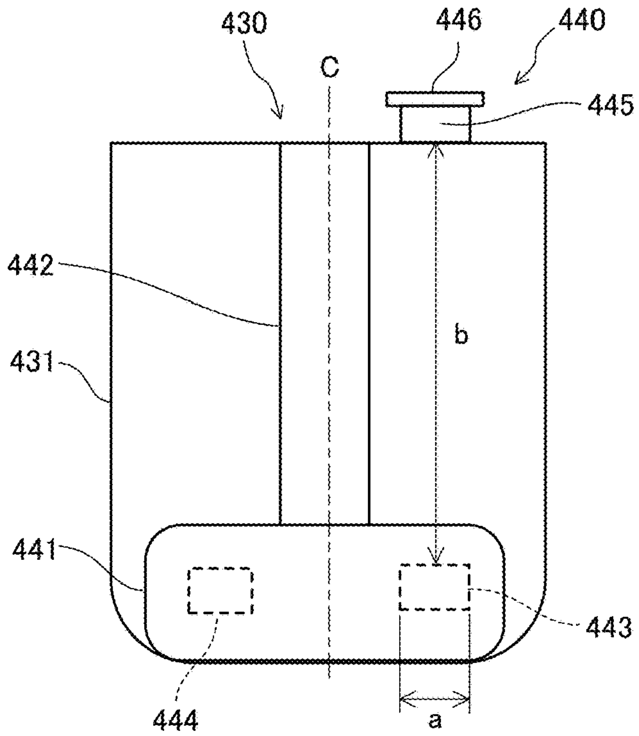
FIG. 3 is a schematic diagram illustrating the ink liquid level height measuring apparatus illustrated in FIG. 1.
Figure 4:
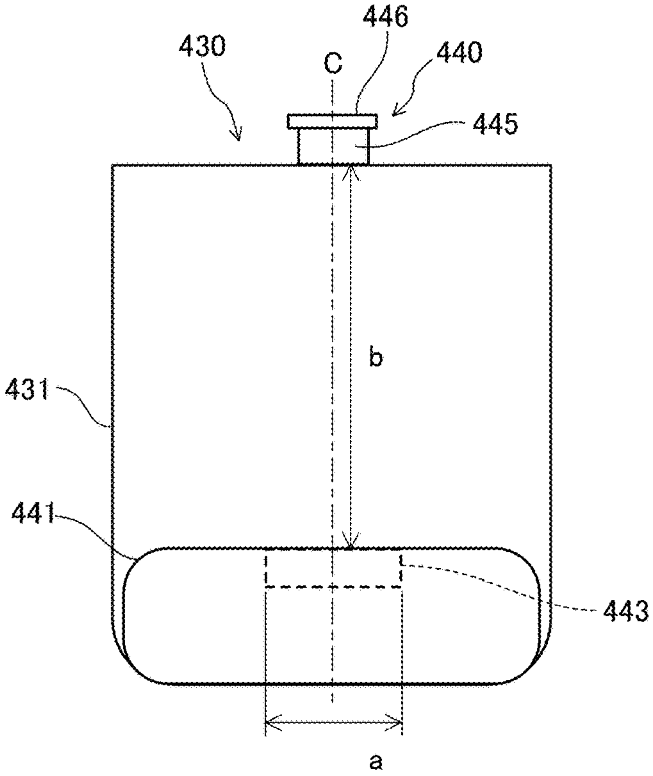
FIG. 4 is a schematic diagram illustrating a variation of the ink liquid level height measuring apparatus illustrated in FIG. 3.

FIG. 3 is a schematic diagram illustrating ink liquid level height measuring apparatus 440 illustrated in FIG. 1. FIG. 4 is a schematic diagram illustrating a variation of ink liquid level height measuring apparatus 440 illustrated in FIG. 3.

As illustrated in FIG. 1, second sub-tank 430 of ink supply section 40 is provided with an ink liquid level height measuring apparatus 440. As illustrated in FIG. 3, ink liquid level height measuring apparatus 440 includes float 441, guide section 442, magnets 443 and 444, sensor 445 (the detection section (detector) in the present invention), magnetic body 446, measurement section 447, and the like.

Float 441 is a floating body that floats on the liquid level of ink I. In a plan view, a through-hole into which guide section 442 is inserted is formed in a center portion of float 441.

Guide section 442 is a rod-shaped member that includes an end part supported by a side of a top plate of second sub-tank 431 and extends downward. Guide section 442 is inserted in the through-hole of float 441. Guide section 442 regulates float 441 such that float 441 does not tilt, and guides float 441 such that float 441 is movable in the vertical direction that is a liquid level height direction, that is, float 441 is movable up and down. Accordingly, float 441 moves up and down along guide section 442 as the liquid level of ink I moves up and down.

Note that, guide section 442 may be a rod-shaped member that includes an end part supported by a side of on the bottom plate of second sub-tank 431 and extends upward as long as guide section 442 regulates float 441 such that float 441 does not tilt, and guides float 441 such that float 441 is movable up and down. Furthermore, as illustrated in FIG. 4, guide section 442 may not be provided. In the example illustrated in FIG. 4, float 441 includes no through-hole, and is formed such that the outer peripheral side surface thereof is in proximity to the inner wall of second sub-tank 431. The inner wall of second sub-tank 431 functions as a guide section that regulates float 441 so as not to be inclined and guides float 441 such that float 441 is movable up and down.

Magnets 443 and 444, which are permanent magnets, are disposed inside float 441. Magnets 443 and 444 are disposed, inside float 441, in positions in which float 441 floating on the liquid level of ink I is balanced so as not to tilt, in other words, in positions in which the positions of magnets 443 and 444 with respect to sensor 445 do not change in the horizontal direction along the liquid level.

Note that, in a case where guide section 442 is not provided as illustrated in the example of FIG. 4, it is not necessary to form a through-hole in the center portion of float 441. For this reason, magnet 443 is disposed in a center portion of float 441 such that float 441 floating on the liquid level of ink I does not tilt.

Ink liquid level height measuring apparatus 440 illustrated in FIG. 3 and ink liquid level height measuring apparatus 440 illustrated in FIG. 4 are different from each other as described above, but have the same basic configuration.

Sensor 445 is a magnetic sensor. As the magnetic sensor, for example, a Hall element can be used, and sensor 445 may include an operational amplifier circuit or the like.

Sensor 445 is disposed in a position in which sensor 445 can measure a change in magnetic flux density due to magnets 443 and 444 that move up and down together with float 441, preferably, in a position in which the magnetic flux density increases For example, sensor 445 is fixed to a side of the top plate of second sub-tank 431 together with magnetic body 446, and is disposed in a position in which sensor 445 faces magnet 443 in the vertical direction. Note that, sensor 445 and magnetic body 446 may also be fixed to a side of the bottom plate of second sub-tank 431 and disposed in positions in which sensor 445 and magnetic body 446 face magnet 443 in the vertical direction.

Figure 5A:
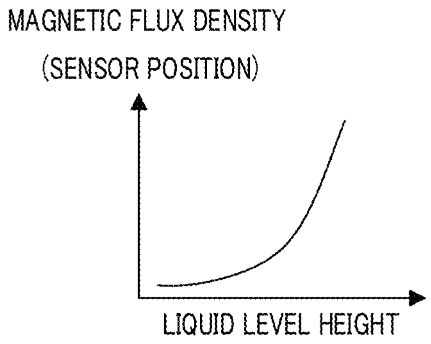
FIG. 5A is a graph illustrating the relationship between the magnetic flux density and the liquid level height in a sensor position with respect to a sensor of the ink liquid level height measuring apparatus illustrated in FIG. 1.
Figure 5B:
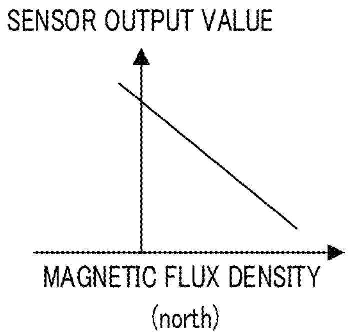
FIG. 5B is a graph illustrating the relationship between the sensor output value and the magnetic flux density with respect to the sensor of the ink liquid level height measuring apparatus illustrated in FIG. 1.
Figure 5C:
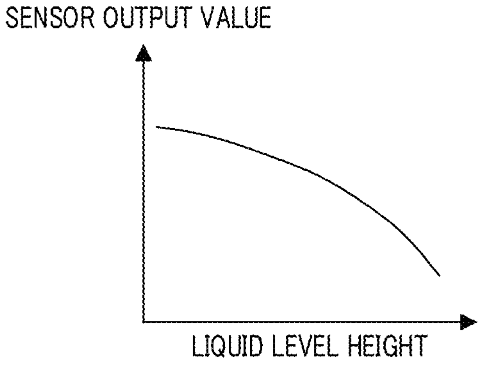
FIG. 5C is a graph illustrating the relationship between the sensor output value and the liquid level height with respect to the sensor of the ink liquid level height measuring apparatus illustrated in FIG. 1.

Here, FIG. 5A is a graph illustrating the relationship between the magnetic flux density and the liquid level height in a sensor position with respect to sensor 445 of ink liquid level height measuring apparatus 440. FIG. 5B is a graph illustrating the relationship between the sensor output value and the magnetic flux density with respect to sensor 445. FIG. 5C is a graph illustrating the relationship between the sensor output value and the liquid level height with respect to sensor 445.

The magnetic flux density due to magnets 443 and 444 in the position of sensor 445 exponentially increases as the liquid level height becomes higher, that is, as magnets 443 and 444 approach sensor 445, as illustrated in FIG. 5A. In addition, with respect to sensor 445 used here, the sensor output value outputted from sensor 445 decreases in inverse proportion to the magnetic flux density of the magnetic field as illustrated in FIG. 5B. Accordingly, as illustrated in FIG. 5C, the sensor output value of sensor 445 decreases quadratically as the liquid level height increases. In this way, sensor 445 detects, as a continuous value, a change in the magnetic flux density, which is a change in the physical quantity associated with a change in the liquid level height, and outputs the sensor output value.

Magnetic body 446 is a member constituted by iron or the like having a high magnetic permeability. In one example, magnetic body 446 is a rectangular plate-like member. Hereinafter, magnetic body 446 is assumed to be a rectangular plate-like member.

Figure 6A:
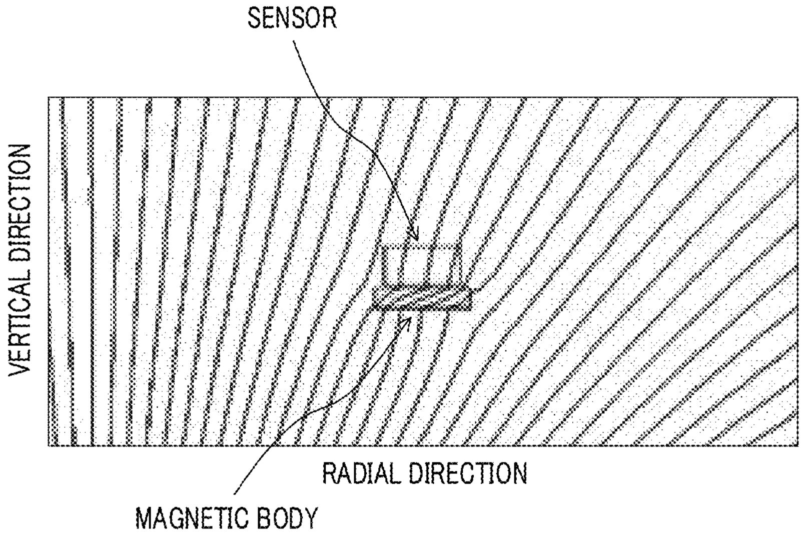
FIG. 6A illustrates a result obtained by analyzing, with a general-purpose finite-element method tool for electromagnetic field analysis, a magnetic field in a case where a magnetic body is disposed in proximity to the lower side of the sensor.
Figure 6B:
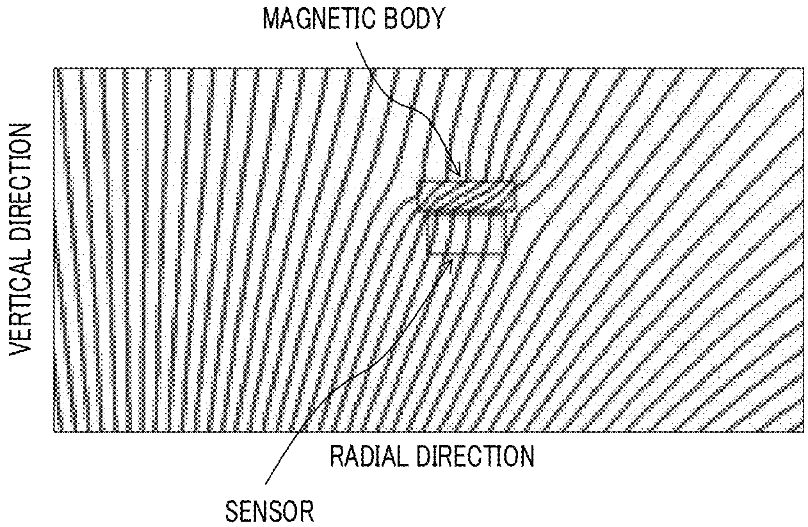
FIG. 6B illustrates a result obtained by analyzing, with a general-purpose finite-element method tool for electromagnetic field analysis, a magnetic field in a case where the magnetic body is disposed in proximity to the upper side of the sensor.
Figure 7:
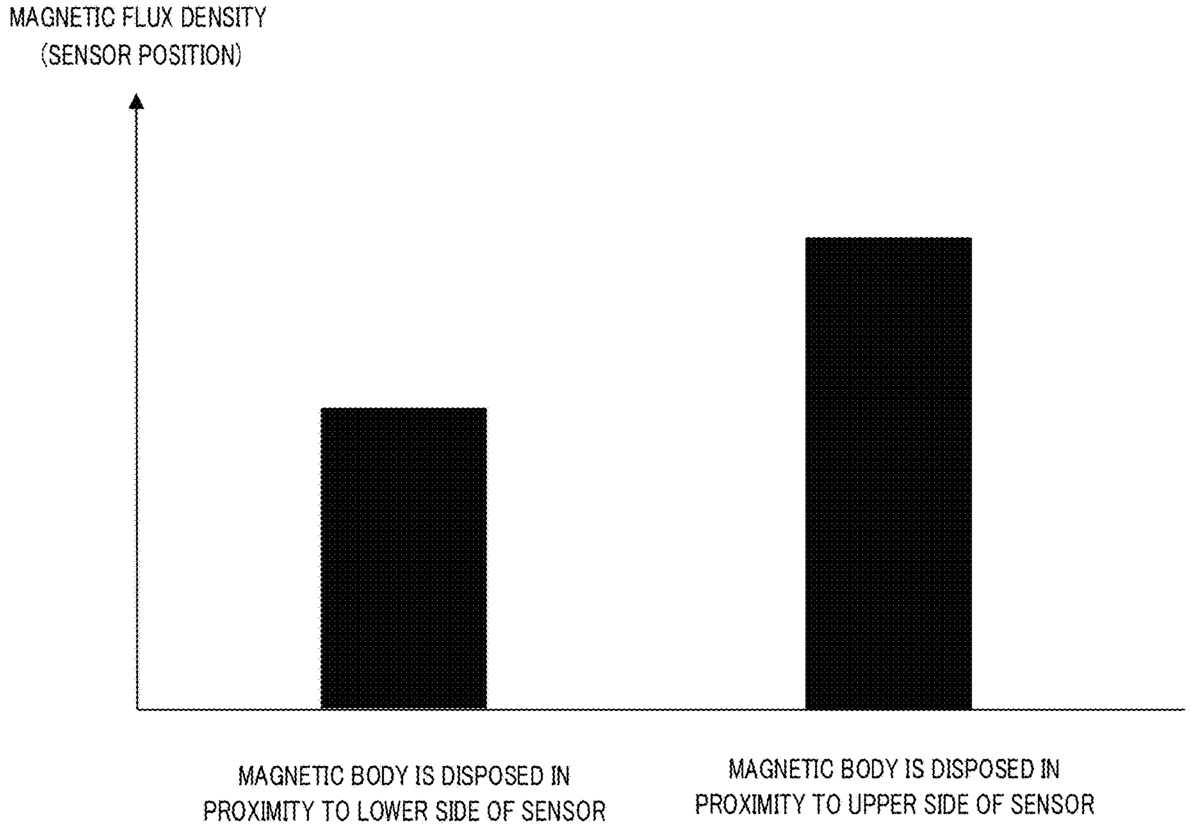
FIG. 7 is a graph comparing the magnetic flux density in the sensor position in a case where the magnetic body is disposed in proximity to the lower side of the sensor with the magnet flux density in the sensor position in a case where the magnetic body is disposed in proximity to the upper side of the sensor.

Here, the disposition of magnetic body 446, specifically, the position of magnetic body 446 above or below sensor 445 will be described with reference to FIGS. 3 and 4 as well as FIGS. 6A to 7. FIG. 6A illustrates a result obtained by analyzing, with a general-purpose finite-element method tool for electromagnetic field analysis, a magnetic field in a case where the magnetic body is disposed in proximity to the lower side of the sensor. FIG. 6B illustrates a result obtained by analyzing, with a general-purpose finite-element method tool for electromagnetic field analysis, a magnetic field in a case where the magnetic body is disposed in proximity to the upper side of the sensor. FIG. 7 is a graph comparing the magnetic flux density in the sensor position in a case where the magnetic body is disposed in proximity to the lower side of the sensor with the magnet flux density in the sensor position in a case where the magnetic body is disposed in proximity to the upper side of the sensor.

Note that, hereinafter, a description will be given on the assumption that the direction of center axis C of second sub-tank 431 is the vertical direction, and the direction orthogonal to center axis C is the radial direction (the orthogonal direction in the present invention).

Usually, the magnetic field is distorted so as to be directed toward a material having a high magnetic permeability, for example, a magnetic body, and the magnetic flux is concentrated. In a case where the magnetic body is disposed in proximity to the lower side of the sensor as illustrated in FIG. 6A, the magnetic field flows in the radial direction due to the magnetic body on the lower side of the sensor, and the magnetic flux density in the sensor position becomes small. In a case where the magnetic body is disposed in proximity to the upper side of the sensor as illustrated in FIG. 6B, on the other hand, the magnetic field is distorted toward the magnetic body, and the magnetic flux is concentrated, and thus, the magnetic flux density in the sensor position increases.

Accordingly, since the magnetic flux density in the sensor position is greater in the case where the magnetic body is disposed in proximity to the upper side of the sensor than in the case where the magnetic body is disposed in proximity to the lower side of the sensor as illustrated in the graph in FIG. 7, it is desirable to dispose the magnetic body on the upper side of the sensor.

Figure 8A:
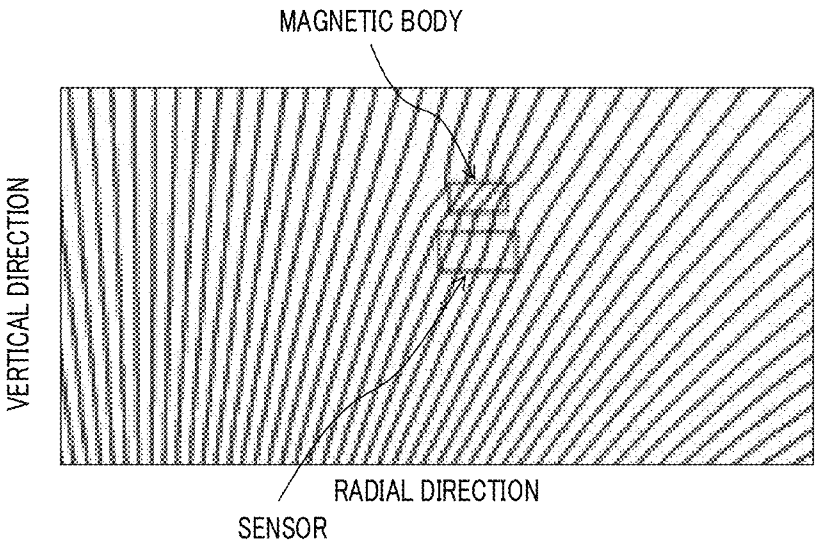
FIG. 8A illustrates a result obtained by analyzing, with a general-purpose finite-element method tool for electromagnetic field analysis, a magnetic field in a case where the magnetic body is disposed away from the sensor.
Figure 8B:
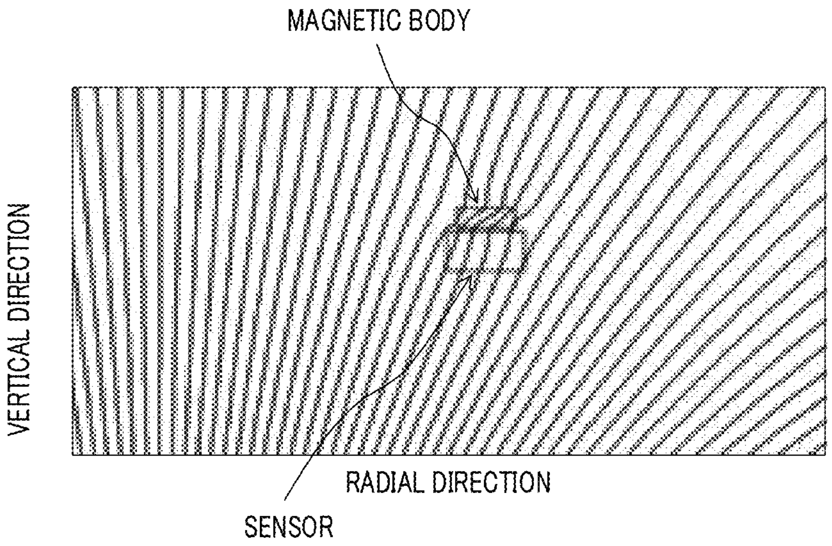
FIG. 8B illustrates a result obtained by analyzing, with a general-purpose finite-element method tool for electromagnetic field analysis, a magnetic field in a case where the magnetic body is disposed in proximity to the sensor.
Figure 9:
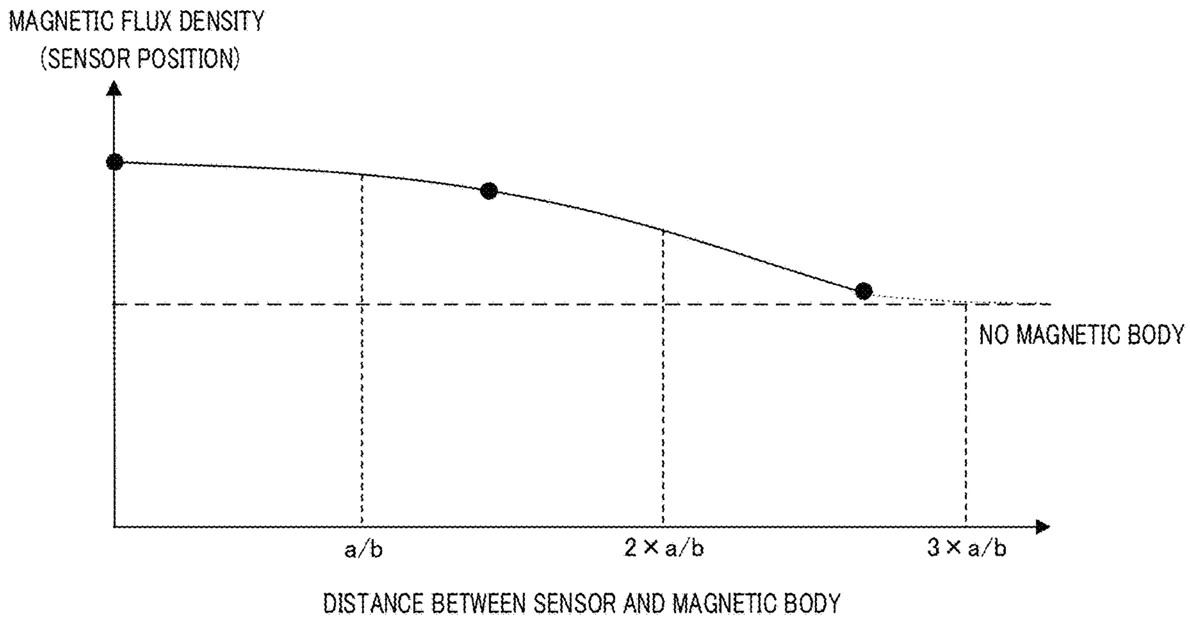
FIG. 9 is a graph illustrating the relationship between the magnetic flux density in the sensor position and the distance between the sensor and the magnetic body.

Furthermore, the disposition of magnetic body 446, specifically, the distance between sensor 445 and magnetic body 446 will be described with reference to FIGS. 8A to 9. FIG. 8A illustrates a result obtained by analyzing, with a general-purpose finite-element method tool for electromagnetic field analysis, a magnetic field in a case where the magnetic body is disposed away from the sensor. FIG. 8B illustrates a result obtained by analyzing, with a general-purpose finite-element method tool for electromagnetic field analysis, a magnetic field in a case where the magnetic body is disposed in proximity to the sensor. FIG. 9 is a graph illustrating the relationship between the magnetic flux density in the sensor position and the distance between the sensor and the magnetic body.

Note that, hereinafter, a description will be given on the assumption that the length (width) of magnet 443 in the radial direction is a and the maximum separation distance between magnet 443 and sensor 445 is b as illustrated in FIGS. 3 and 4.

As described above, usually, the magnetic field is distorted so as to be directed toward a magnetic body, and the magnetic flux is concentrated. For this reason, in a case where the magnetic body is disposed in proximity to the sensor (FIG. 8B), the magnetic field which penetrates the sensor is more in the vertical direction than in a case where the magnetic body is disposed away from the sensor (FIG. 8A). When the magnetic field which penetrates the sensor is in the vertical direction due to the magnetic body, the direction becomes the same as the direction of the magnetic field in which the detection sensitivity of the sensor used in the present embodiment is high, and thus, the magnetic flux density to be detected increases.

When the relationship between the magnetic flux density in the sensor position and the distance between the sensor and the magnetic body is confirmed, the magnetic flux density in the sensor position decreases as the distance between the sensor and the magnetic body increases as illustrated in the graph in FIG. 9. Note that, in the graph in FIG. 9, the dotted line indicates the magnetic flux density in the sensor position in a case where there is no magnetic body.

In the graph in FIG. 9, the distance between the sensor and the magnetic body is expressed by using dimensionless number a/b. In the graph illustrated in FIG. 9, when the distance between the sensor and the magnetic body is equal to or greater than 3×a/b, the magnetic flux density in the sensor position is estimated to be close to the magnetic flux density in a case where there is no magnetic body.

In a case where the distance between the sensor and the magnetic body is equal to or less than 2×a/b, on the other hand, the magnetic flux density in the sensor position is greater than the magnetic flux density in a case where there is no magnetic body. In a case where the distance between the sensor and the magnetic body is equal to or less than a/b, the magnetic flux density in the sensor position is much greater than the magnetic flux density in a case where there is no magnetic body. Accordingly, it is desirable to dispose the magnetic body within a periphery of 2×a/b from the sensor, and it is more desirable to dispose the magnetic body within a periphery of a/b from the sensor.

Figure 10:
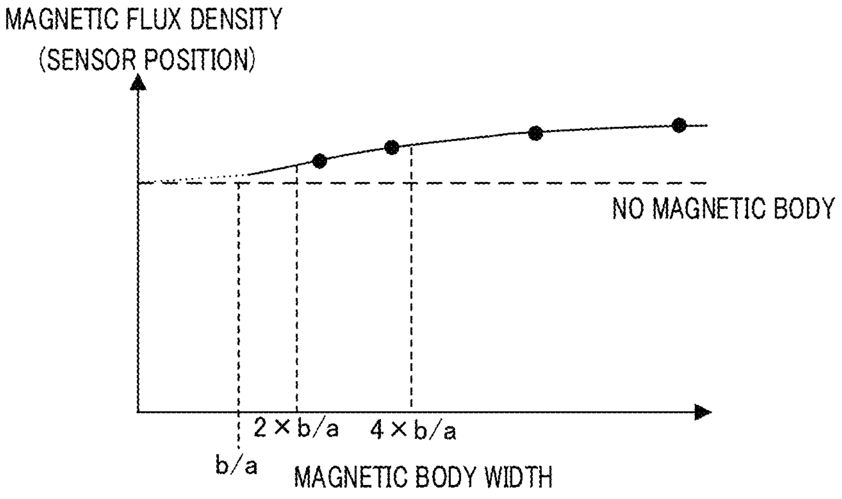
FIG. 10 is a graph illustrating the relationship between the magnetic flux density in the sensor position and the magnetic body width.
Figure 11:
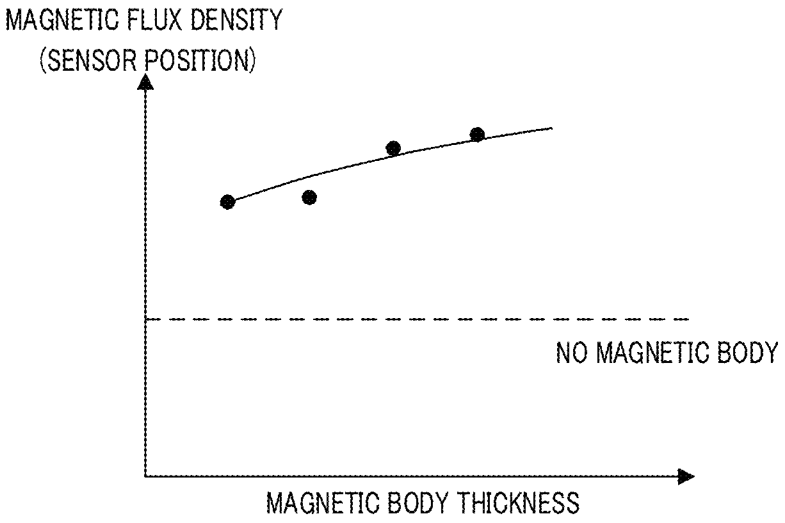
FIG. 11 is a graph illustrating the relationship between the magnetic flux density in the sensor position and the magnetic body thickness.
Figure 12:
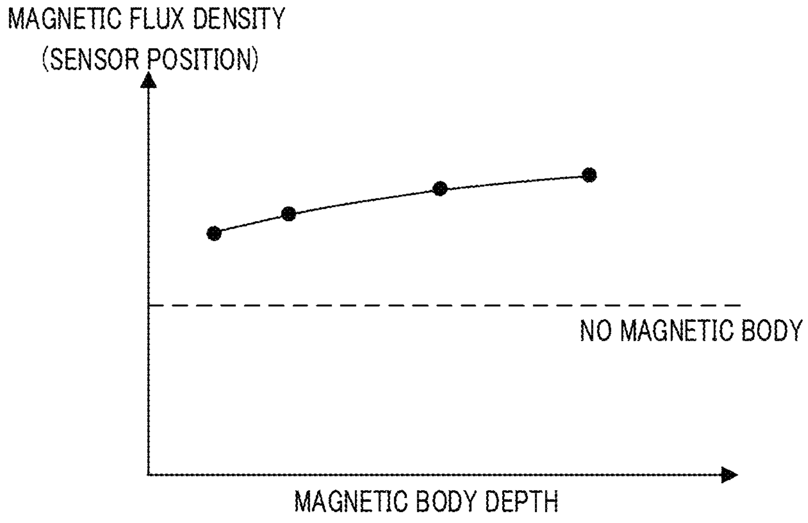
FIG. 12 is a graph illustrating the relationship between the magnetic flux density in the sensor position and the magnetic body depth.

Further, the size of magnetic body 446 will be described with reference to FIGS. 10 and 11. FIG. 10 is a graph illustrating the relationship between the magnetic flux density in the sensor position and the magnetic body width. FIG. 11 is a graph illustrating the relationship between the magnetic flux density in the sensor position and the magnetic body thickness. FIG. 12 is a graph illustrating the relationship between the magnetic flux density in the sensor position and the magnetic body depth.

When the relationship between the magnetic flux density in the sensor position and the magnetic body width (the width of magnetic body 446 in the radial direction) is confirmed, the magnetic flux density in the sensor position increases as the magnetic body width increases as illustrated in the graph in FIG. 10. Note that, in the graph in FIG. 10, the dotted line indicates the magnetic flux density in the sensor position in the case where there is no magnetic body.

In the graph in FIG. 10, the magnetic body width is expressed by using dimensionless number b/a. In the graph illustrated in FIG. 10, in a case where the magnetic body width is equal to or smaller than b/a, the magnetic flux density in the sensor position is estimated to be close to the magnetic flux density in the case where there is no magnetic body.

In a case where the magnetic body width is equal to or greater than 2×b/a, on the other hand, the magnetic flux density in the sensor position is greater than the magnetic flux density in a case where there is no magnetic body. In a case where the magnetic body width is equal to or greater than 3×b/a, the magnetic flux density in the sensor position is much greater than the magnetic flux density in a case where there is no magnetic body. Accordingly, the magnetic body width is desirably equal to or greater than 2×b/a, and more desirably is equal to or greater than 3×b/a.

In addition, when the relationship between the magnetic flux density in the sensor position and the magnetic body thickness (the thickness of magnetic body 446 in the vertical direction) is confirmed, the magnetic flux density in the sensor position increases as the magnetic body thickness increases as illustrated in the graph in FIG. 11. Accordingly, the magnetic body thickness is desirably large. Note that, in the graph in FIG. 11, the dotted line indicates the magnetic flux density in the sensor position in a case where there is no magnetic body.

In addition, when the relationship between the magnetic flux density in the sensor position and the magnetic body depth (the depth of magnetic body 446 in the direction perpendicular to the radial direction) is confirmed, the magnetic flux density in the sensor position increases as the magnetic body depth increases as illustrated in the graph in FIG. 12. Accordingly, the magnetic body depth is desirably large. Note that, in the graph in FIG. 12, the dotted line indicates the magnetic flux density in the sensor position in the case where there is no magnetic body.

Given the above, it is desirable to dispose magnetic body 446 in proximity to the upper side of sensor 445, and the size (width, thickness, and depth) of magnetic body 446 is desirably large.

Since magnetic body 446 is disposed in proximity to the upper side of sensor 445, the sensor 263 detects, as a continuous value, the liquid level of ink I, that is, the magnetic flux density that changes as float 441 moves up and down, with high sensitivity, and outputs a value corresponding to the liquid level height (see FIGS. 5A to 5C). As a result, ink liquid level height measuring apparatus 440 can continuously measure the liquid level height of ink I with high accuracy.

Measurement section 447 is a so-called computer, and includes, albeit illustration is omitted, a central processing unit (CPU) as an arithmetic/control apparatus, a read only memory (ROM) and a random access memory (RAM) as main storage apparatuses, and the like. Measurement section 447 includes at least one hardware processor. Measurement section 447 obtains the liquid level height based on the output value from sensor 445 (see FIG. 5C). Furthermore, measurement section 447 determines the state of liquid feed section 420 (tank supply path 421) based on the liquid level height with respect to a reference height or the rate of change in the liquid level height (the determination section in the present invention).

For example, control section 90 drives pneumatic pump 432 while causing ink liquid level height measuring apparatus 440 to measure the liquid level height of ink I in second sub-tank 431 to align (lower) the liquid level height with the reference height. The reference height is settable to an appropriate height as long as the liquid level height in second sub-tank 431 after feeding of ink I, which will be described later, does not exceed the upper limit height of second sub-tank 431.

After the liquid level height of ink I in second sub-tank 431 is aligned with the reference height, control section 90 drives pump 423 for a predetermined time (for example, 10 seconds) to feed ink I from first sub-tank 411 to second sub-tank 431. As the predetermined time for which pump 423 is driven, an appropriate time is settable as long as the liquid level height in second sub-tank 431 after feeding of ink I does not exceed the upper limit height of second sub-tank 431. According to the above-described procedure, measurement section 447 can obtain the liquid level height with respect to the reference height and the rate of change in the liquid level height for the driving time of pump 423.

Figure 13:
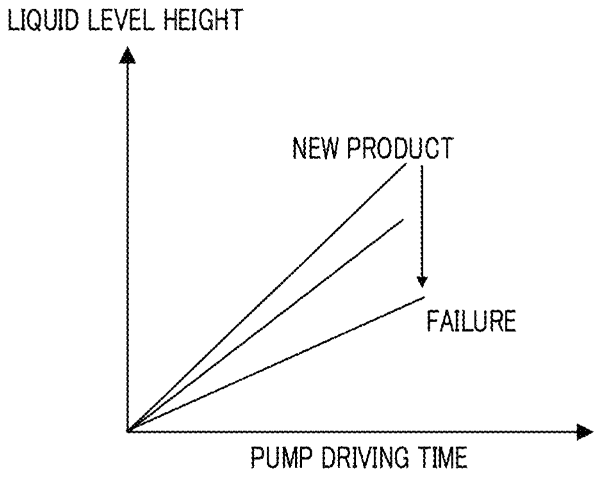
FIG. 13 is a graph illustrating the relationship between the pump driving time and the liquid level height from a state in which an ink supply section is a new product to a state in which the ink supply section is determined to have a failure.

Here, FIG. 13 is a graph illustrating the relationship between the driving time of pump 423 and the liquid level height of ink I in second sub-tank 431 from a state in which ink supply section 40 is a new product to a state in which ink supply section 40 is determined to have a failure.

As illustrated in FIG. 13, the liquid level height of ink I in second sub-tank 431 increases linearly with respect to the driving time of pump 423, but the rate of change in the liquid level height decreases from the state in which ink supply section 40 is a new product to the state in which ink supply section 40 is determined to have a failure.

For example, liquid feed section 420 in ink supply section 40 includes filter 425 for filtering ink I. Since clogging progresses over time in filter 425, the feed amount of ink I fed from first sub-tank 411 to second sub-tank 431 also decreases over time.

Accordingly, when pump 423 is driven for a predetermined time to feed ink I from first sub-tank 411 to second sub-tank 431, liquid feed section 420 can determine the state (whether there is a failure) based on the liquid level height with respect to the reference height (for example, the position before liquid feed) or the rate of change in the liquid level height.

Figure 14:
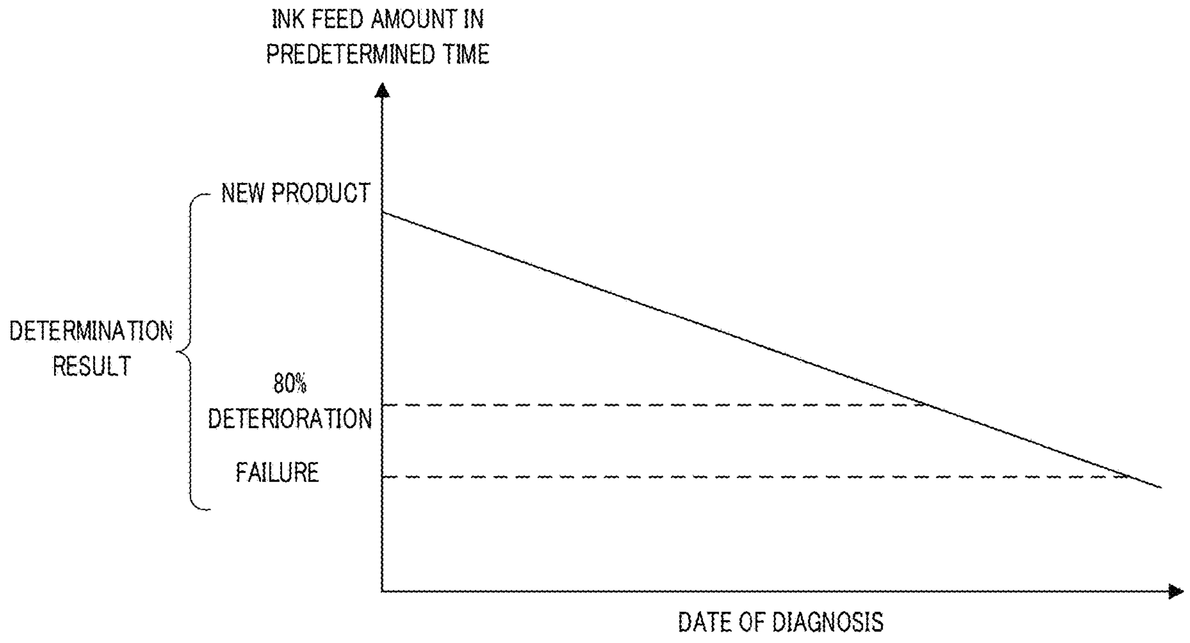
FIG. 14 is a graph illustrating a determination result obtained by making determination based on a change over time in the liquid feed amount of ink in a predetermined time.

FIG. 14 is a graph illustrating a determination result obtained by making determination based on a change over time in the liquid feed amount of ink I in a predetermined time. In the present embodiment. ink liquid level height measuring apparatus 440 measures the liquid level as a continuous amount, unlike the apparatuses disclosed in PTLs 1 and 2 that detect the liquid level discretely. Accordingly, ink liquid level height measuring apparatus 440 can determine the degree of deterioration in liquid feed section 420 between the state of a new product and the state of a failure as illustrated in FIG. 14 by monitoring the liquid level height with respect to the reference height or the rate of change in the liquid level over time (for example, every day).

Furthermore, as illustrated in FIG. 14, ink liquid level height measuring apparatus 440 can also predict the degree of deterioration and the time of a failure by monitoring the liquid level height with respect to the reference height and the rate of change in the liquid level over time. In this way, since the degree of deterioration can be predicted, it is possible to prevent liquid feed section 420 from having a failure to cause inkjet printer 100 to stop, for example, by predicting the time of 80% deterioration and replacing the deteriorated component(s) at the predicted time of 80% deterioration. That is, it is possible to prevent liquid feed section 420 from having a failure to cause inkjet printer 100 to stop by replacing deteriorated component(s) before a failure occurs.

Note that, measurement section 447 functions here as a determination section that determines the state of liquid feed section 420, but control section 90 may be configured to function as a determination section that determines the state of liquid feed section 420 based on the liquid level height obtained by measurement section 447.

As described above, in the present embodiment, inkjet printer 100 includes ink liquid level height measuring apparatus 440. Ink liquid level height measuring apparatus 440 includes: sensor 445 that detects, as a continuous value, a change in the physical quantity (magnetic flux density) associated with a change in the liquid level height of ink I in second sub-tank 431; and measurement section 447 that obtains the liquid level height based on the physical quantity that has been detected.

According to the present embodiment configured in the above-described manner, sensor 445 detects, as a continuous value, a change in the physical quantity (magnetic flux density) associated with a change in the liquid level height of ink I in second sub-tank 431, and thus, the liquid level height of the ink can be continuously measured with high accuracy.

Furthermore, since ink liquid level height measuring apparatus 440 includes magnetic body 446 disposed in proximity to the upper side of sensor 445, the liquid level height of the ink can be measured with higher accuracy.

Furthermore, in ink liquid level height measuring apparatus 440, measurement section 447 determines the state of liquid feed section 420 based on the liquid level height with respect to the reference height or the rate of change in the liquid level height, and thus, it is possible to determine whether liquid feed section 420 has a failure, and it is also possible to predict the degree of deterioration or the time of a failure.

Any of the embodiment described above is only illustration of an exemplary embodiment for implementing the present invention, and the technical scope of the present invention shall not be construed limitedly thereby. That is, the present invention can be implemented in various forms without departing from the gist or the main features thereof.

Although embodiments of the present invention have been described and illustrated in detail, the disclosed embodiments are made for purpose of illustration and example only and not limitation. The scope of the present invention should be interpreted by terms of the appended claims.

What is claimed is:

1. An ink liquid level height measuring apparatus, comprising:

a detector that detects, as a continuous value, a change in a physical quantity associated with a change in a liquid level height of ink in a container;

a magnetic body, the detector and the magnetic body being fixed to the container;

a float disposed in the container that moves in association with the change in the liquid level height and includes a magnet; and at least one hardware processor, wherein the detector is a sensor that detects, as the continuous value, a change in magnetic flux density due to the magnet, the magnetic body and the sensor are disposed such that the sensor is located between the magnetic body and the magnet, and the at least one hardware processor obtains the liquid level height based on the physical quantity that has been detected.

2. The ink liquid level height measuring apparatus according to claim 1, wherein the at least one hardware processor determines a state of an ink supply path to the container based on the liquid level height with respect to a reference height or a rate of change in the liquid level height.

3. The ink liquid level height measuring apparatus according to claim 2, wherein the at least one hardware processor determines the state of the ink supply path based on the liquid level height in a case where the ink has been supplied to the container for a predetermined time.

4. The ink liquid level height measuring apparatus according to claim 2, wherein the at least one hardware processor determines the state of the ink supply path based on the rate of change in the liquid level height in a case where the ink is supplied to the container for a predetermined time.

5. The ink liquid level height measuring apparatus according to claim 2, wherein the ink supply path includes a filter.

6. An image forming apparatus, comprising:

a container that stores ink;

an image former that forms an image by using the ink supplied from the container; and the ink liquid level height measuring apparatus according to claim 1.

7. The ink liquid level height measuring apparatus according to claim 1, wherein the sensor is fixed to the container at a top of the container with the magnetic body.

8. The ink liquid level height measuring apparatus according to claim 1, wherein the sensor faces the magnet in a vertical direction.

9. The ink liquid level height measuring apparatus according to claim 1, wherein the magnetic body is disposed within a periphery of $2 \times a/b$ from the sensor, where a denotes a width of the magnet in an orthogonal direction orthogonal to a liquid level height direction and b denotes a maximum separation distance between the magnet and the sensor in the liquid level height direction.

10. The ink liquid level height measuring apparatus according to claim 9, wherein the magnetic body is disposed within a periphery of $a/b$ from the sensor.

11. The ink liquid level height measuring apparatus according to claim 9, wherein the width of the magnetic body in the orthogonal direction is equal to or greater than $2 > b/a$.

12. The ink liquid level height measuring apparatus according to claim 11, wherein the width of the magnetic body is equal to or greater than $4 \times b/a$.

* * * * *